United States Patent
Inose (10) Patent No.: US 12,237,109 B2
(45) Date of Patent: Feb. 25, 2025

(54) MAGNETIC CIRCUIT ELEMENT FOR SOLENOID

(71) Applicant: GKN Automotive Limited, Birmingham (GB)

(72) Inventor: Hideyuki Inose, Tochigi (JP)

(73) Assignee: GKN Automotive Limited, Birmingham (GB)

(*) Notice: Subject to any disclaimer, the term of this patent is extended or adjusted under 35 U.S.C. 154(b) by 559 days.

(21) Appl. No.: 17/580,932

(22) Filed: Jan. 21, 2022

(65) Prior Publication Data
US 2022/0148783 A1    May 12, 2022

Related U.S. Application Data

(63) Continuation of application No. PCT/JP2019/031919, filed on Aug. 14, 2019.

(51) Int. Cl.
*H01F 7/08* (2006.01)
*H01F 7/127* (2006.01)
*H01F 7/16* (2006.01)

(52) U.S. Cl.
CPC ............ *H01F 7/081* (2013.01); *H01F 7/127* (2013.01); *H01F 7/1607* (2013.01)

(58) Field of Classification Search
CPC ........ H01F 7/081; H01F 7/127; H01F 7/1607; F16H 48/34
See application file for complete search history.

(56) References Cited

U.S. PATENT DOCUMENTS

| | | | | |
|---|---|---|---|---|
| 3,564,469 A | * | 2/1971 | Anastasio et al. | H01F 7/1607 335/278 |
| 4,984,549 A | * | 1/1991 | Mesenich | F02M 51/066 123/585 |
| 6,446,772 B1 | * | 9/2002 | Inose | F16D 27/115 192/48.2 |
| 8,928,440 B2 | | 1/2015 | Matsumoto et al. | |
| 2013/0237363 A1 | | 9/2013 | Fusegi et al. | |
| 2014/0028423 A1 | | 1/2014 | Matsumoto et al. | |
| 2017/0297428 A1 | * | 10/2017 | Inose | F16D 27/112 |

FOREIGN PATENT DOCUMENTS

| | | | | |
|---|---|---|---|---|
| CN | 103578684 A | | 2/2014 | |
| DE | 102013214647 A | | 5/2014 | |
| JP | 2011119329 A | * | 6/2011 | H01F 7/127 |
| JP | 2013185676 A | | 9/2013 | |
| JP | 201427205 A | | 2/2014 | |
| JP | 2015102185 A | * | 6/2015 | |
| WO | 2016035129 A1 | | 3/2016 | |
| WO | WO-2016088232 A1 | * | 6/2016 | |

OTHER PUBLICATIONS

International Search Report and Written Opinion for PCT/JP2019/031919 mailed Oct. 8, 2019 (6 pages; with English translation).

* cited by examiner

*Primary Examiner* — Mohamad A Musleh
(74) *Attorney, Agent, or Firm* — Reising Ethington P.C.

(57) ABSTRACT

A magnetic circuit element, used in combination with an adjoining core covering a solenoid having an axis, includes a plate having a soft magnetic material with a face configured to contact an axial end face of the core to form a magnetic path in combination with the core to conduct a magnetic flux. The plate forms a disk shape defining an opening around the axis and is dimensioned to extend the face from an inner periphery to an outer periphery of the axial end face of the core.

5 Claims, 7 Drawing Sheets

MAGNETIC CIRCUIT ELEMENT FOR SOLENOID

CROSS-REFERENCE TO RELATED APPLICATIONS

This application is a continuation Application of, and claims priority to, Patent Cooperation Treaty Application No. PCT/JP2019/031919, filed on Aug. 14, 2019, which application is hereby incorporated herein by reference in its entirety.

BACKGROUND

Field

The present disclosure relates to a magnetic circuit element and, more particularly, relates to a magnetic circuit element used in combination with an annular core to form a magnetic circuit for conducting magnetic flux, such as in a solenoid.

Description of the Related Art

Rotating machines used in automobiles often use clutches to control their functions. For example, a differential device may include a frictional clutch or dog clutch for the purpose of temporarily limiting or suspending differential motion between output shafts. In these devices, solenoid actuators may be used to drive the clutch from outside of the device.

In order to obtain a large magnetic flux from a magnetic field generated by a winding, a core made of soft magnetic material is generally used for the solenoid actuator. To improve the actuator output without increasing electric current, either the number of turns of the winding or the sectional area of the core must be increased. As both these measures inevitably increase the weight and the volume of the actuator, design determinations are typically made based upon factors such as available electric power and available space for housing the actuator.

Japanese Patent Application Laid-open No. 2013-185676 and International Patent Publication No. WO 2016/035129 A1 disclose related arts.

SUMMARY

Implementation and mounting of a solenoid actuator require consideration of some additional factors. More specifically, since a solenoid actuator is a non-rotating member, whereas a rotating machine rotates about an axis, it is necessary to prevent rotation and align the solenoid actuator with respect to the axis. Further, from the viewpoint of energy efficiency and reliability, it is necessary to prevent leakage of magnetic flux to peripheral members. The present disclosure addresses both of these problems simultaneously.

According to an implementation, a magnetic circuit element is used in combination with an adjoining core that covers a solenoid and has a ring form around an axis. The magnetic circuit element includes a plate of a soft magnetic material in contact with an axial end face of the core to form a magnetic path in combination with the core to conduct a magnetic flux. The plate has a disk shape defining an opening around the axis and is dimensioned as to extend the face contact from an inner periphery to an outer periphery of the end face of the axial end face.

DESCRIPTION OF EMBODIMENTS

Exemplary implementations will be described hereinafter with reference to the appended drawings. Throughout the following description and the appended claims, unless otherwise specified, an axis refers to a central axis of a solenoid, which coincides with a rotational axis of a clutch driven by the solenoid and of a rotating machine when using a coaxial structure. It is particularly noted that the drawings are not necessarily to scale and therefore dimensional relations among elements are not limited to those illustrated therein.

Figure 1:
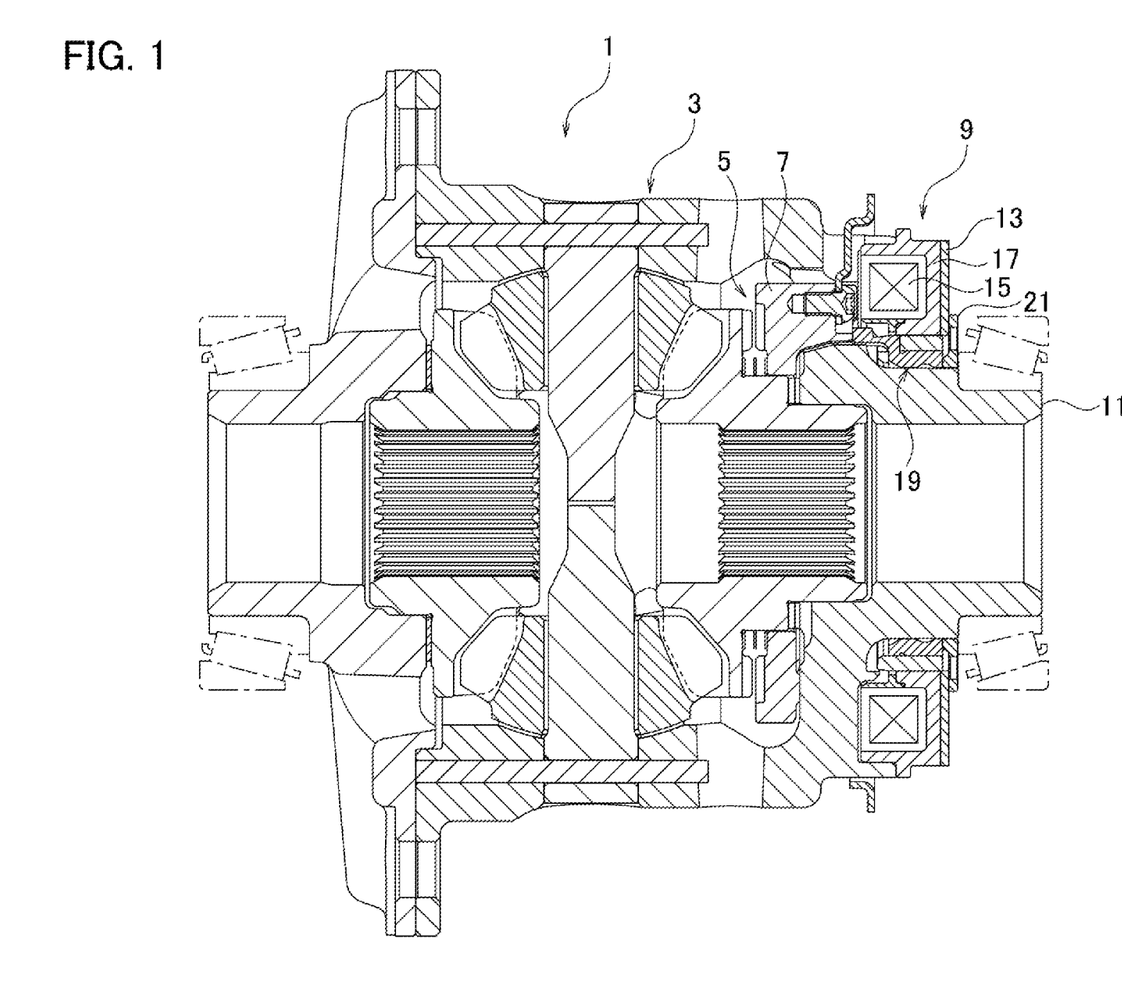
FIG. 1 is a sectional elevational view of a locking differential driven by a solenoid including a magnetic circuit element according to an implementation.

Referring to FIG. 1, a locking differential device 1 includes a differential gear set 3 and a dog clutch 5 for locking one of its output gears. By moving a clutch member 7 engaged with a casing in its axial direction, the dog clutch 5 gets engaged, thereby temporarily suspending differential motion in the differential gear set 3. A solenoid actuator 9 in accordance with the present disclosure is, for example, used for the purpose of driving the clutch member 7 in the locking differential 1, but is not limited thereto and may be used in combination with any other device, such as a free-running differential, a shift device, or any of various rotating machines.

In the illustrated example, the actuator 9 itself is a stationary member, and the clutch member 7 is indirectly driven by driving the plunger 19. Alternately, the actuator 9 may move along with or without the plunger 19 and thus drive the clutch member 7.

The actuator 9 includes a winding 15 and a core 17 that covers the winding 15. The winding 15 is a so-called electromagnetic coil or solenoid which is electrically connected to an external power source via a cable and, on input of electric power, creates a magnetic field around itself.

The core 17 is formed of a soft magnetic material so as to conduct a magnetic field to generate a large magnetic flux.

Examples of soft magnetic material include structural steels for machinery, silicon steels, and ferritic or martensitic steels, and particularly those annealed for the purpose of improving its magnetic permeability. The core 17 is annularly formed around the axis and can be substantially symmetrical about the axis so as to uniformly distribute the magnetic flux around the axis. The whole thereof is like a short cylinder along the axis in general and its radially internal periphery forms a smooth cylindrical surface. The radially external periphery may form a cylindrical surface, or may be provided with steps so as to abut against the casing of the device 1. Both ends in the axial direction may be flat surfaces, but the core on one end facing the casing may be omitted, as described below.

The core 17 may cover all of the internal periphery, the external periphery, and both the ends of the winding 15, but may have a gap on its internal periphery, and in a case where a plunger 19 is provided, the plunger 19 may fit in the core 17 so as to span the gap. The magnetic flux guided by the magnetic path forms a loop around the winding 15 and makes a detour around the gap to pass through the plunger 19, thereby driving the plunger. The core may be partially omitted on the side facing the casing of the device 1, and the end wall of the casing may instead participate in the magnetic circuit. In the latter structure, the gap for driving the plunger 19 may be held between the core 17 and the casing.

The plunger 19 may be generally formed in a cylindrical shape so as to fit within the internal periphery of the core 17. The plunger 19 may be totally formed of the soft magnetic material, or may be formed of a combination of a soft magnetic material and a non-magnetic material so as to suppress leakage of the magnetic flux. Examples of the non-magnetic material include austenitic stainless steels, non-magnetic steels such as so-called high-manganese steels, and copper or copper-alloys. In the illustrated example, the plunger 19 is provided with an inner ring made of a non-magnetic material and an outer ring made of a soft magnetic material securely fit on the inner ring by press-fitting or the like to face the core 17.

The outer ring receives the magnetic flux from the actuator 9 to generate driving force and transmits the force to the inner ring. The inner ring slidably fits on a boss portion 11 of the differential case and, guided thereby, slides in the axial direction. The inner ring is elongated or extended toward the clutch member 7, and thus gets contact with and drives the clutch member 7. Because the outer ring having magnetism is limited on the side facing the core 17, leakage of the magnetic flux into the differential case is suppressed, and the plunger 19 is prevented from sticking to any member by residual magnetic flux.

Figure 2:
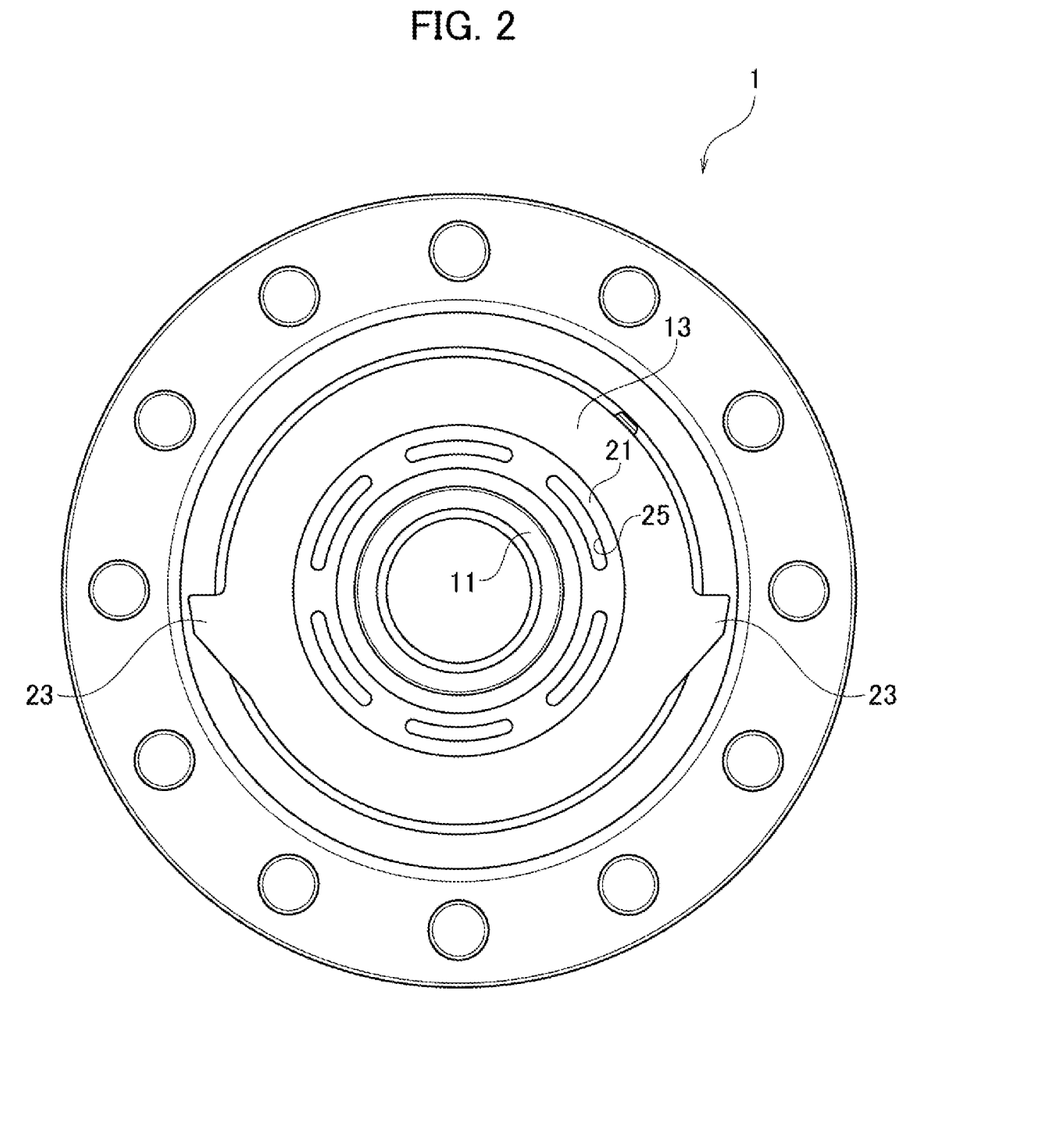
FIG. 2 is a side view of the locking differential, which shows the side of the magnetic circuit element.
Figure 5:
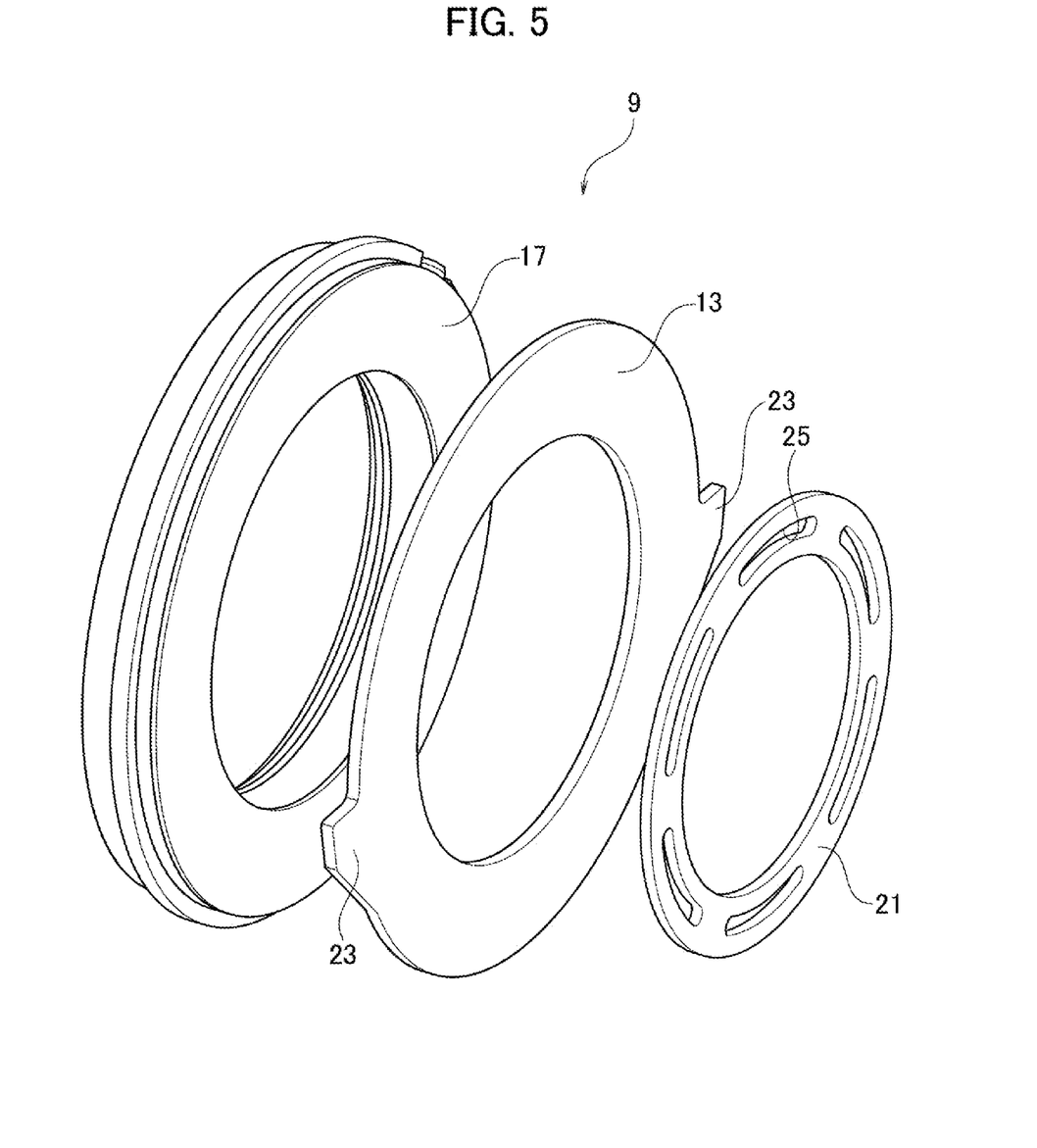
FIG. 5 is an exploded perspective view of the solenoid including a magnetic circuit element and a limit ring.

Referring to FIGS. 2 and 5 in combination with FIG. 1, a magnetic circuit element, which, when used in combination with the adjoining core 17, constitutes a magnetic circuit in combination with the core 17, at least includes a plate 13 entirely formed of a soft magnetic material. The plate 13, although a separate body from the core 17, can be in close contact therewith to conduct part of the magnetic flux, and thus contributes to increase of output of the actuator 9 because it contributes to an increase of sectional area of the magnetic path. as Alternately, since the plate 13 contributes to an increased cross-sectional area of the magnetic path, reduction of thickness of the core 17 does not lead to decrease of the output of the actuator 9 and therefore it contributes to reduction in size of the actuator 9, particularly size reduction in the axial direction.

The plate 13 is formed generally disk-shaped so as to extend parallel to the core 17, and at its inner periphery defines an opening around the axis. In a case where the end face of the core 17 is flat, the plate 13 may be also generally flat so as to have face contact with the flat end face. Alternatively, the plate 13 may have irregularities such as a ridge-and-furrow pattern corresponding to, or not corresponding to, ridges and furrows on the end face of the core 17. Furthermore, the thickness of the plate 13 does not have to be uniform.

Figure 3:
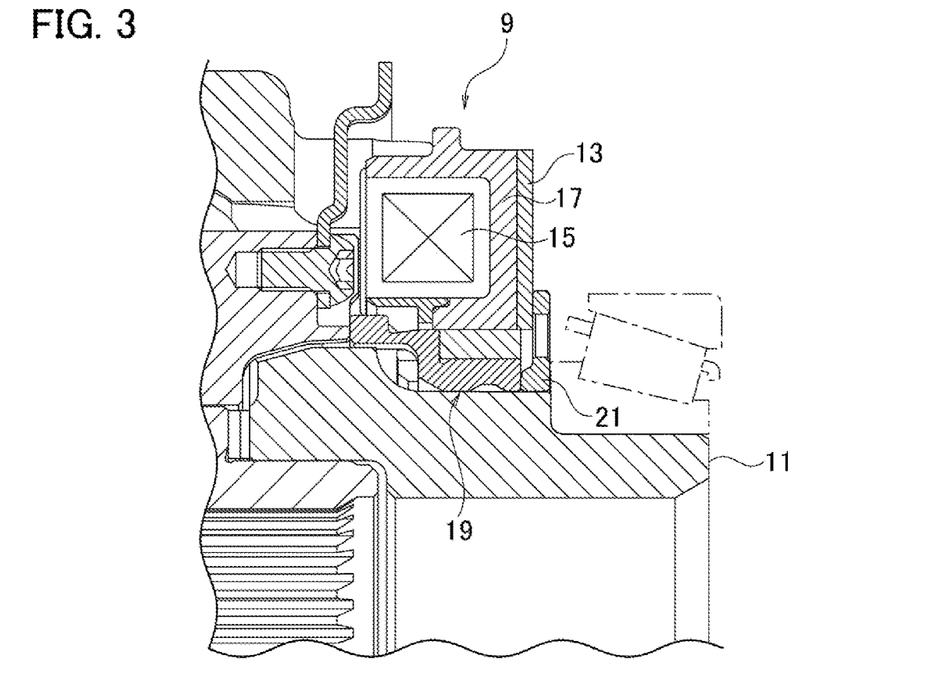
FIG. 3 is a partial sectional elevational view of the locking differential driven by the solenoid including the magnetic circuit element corresponding to FIG. 1, which primarily shows the solenoid.

It is beneficial to increase of sectional area of the magnetic path to elongate the outer border and the inner periphery of the plate 13, but its effect would be saturated if elongation were excessive to make them protrude from the core 17. Thus, as shown in FIG. 3, the outer border may extend at least the outer periphery of the end face of the core 17. Further the inner periphery defining the opening may extend at least the inner periphery of the end face of the core 17. More specifically, the plate 13 may be so dimensioned as to expand the face contact from the inner periphery to the outer periphery of the end face of the core 17.

Figure 4:
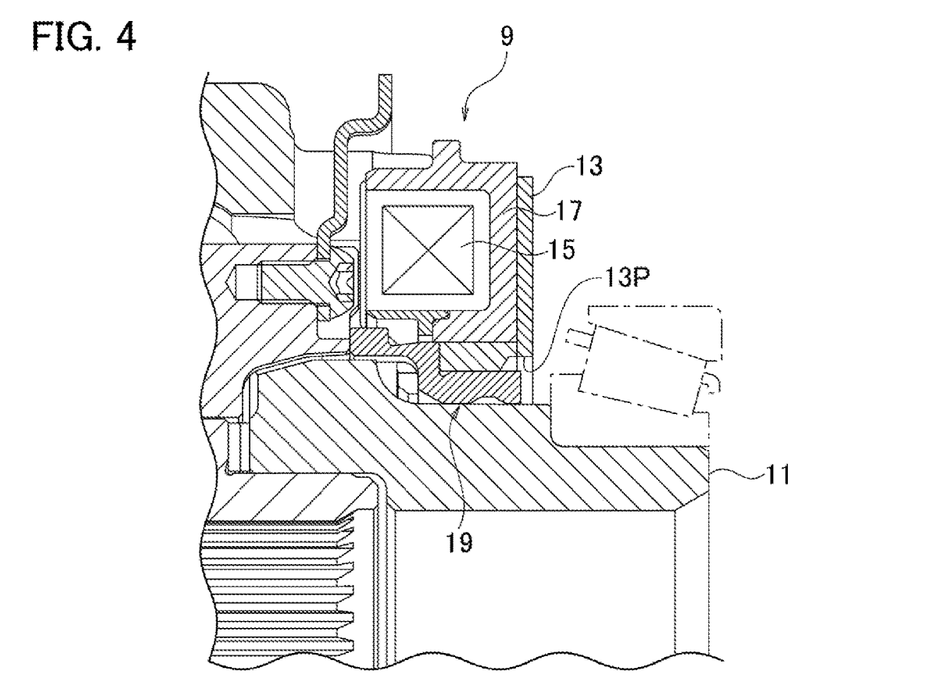
FIG. 4 is a partial sectional elevational view showing an example implementation modified from that shown in FIG. 3.

According to the implementation shown in FIG. 3, the opening defined by the inner periphery of the plate 13 allows the plunger 19 to pass therethrough in the axial direction. This structure is beneficial in widening the range of motion of the plunger 19. Alternatively, as shown in FIG. 4, the inner periphery may extend radially inwardly so that the rear end of the plunger 19 butts against the inner periphery. The whole length of the inner periphery may not necessarily butt against the plunger 19. For example, a plurality of projections elongated radially inwardly from the inner periphery may be arranged at intervals in the circumferential direction. The embodiment shown in FIG. 4 allows omission of a limit ring 21 described later because the plate 13 by itself limits backward motion of the plunger 19.

The plate 13 and the core 17 may be fixed to each other by means of any adhesive, spot-welding, or the like, but are not so limited thereto, and also may not be fixed to each other. As relatively large areas contribute to the face contact therebetween, the close contact thereof sufficiently limits motion relative to each other and in particular, preventing rotation of the plate 13 is sufficient to also prevent rotation the core 17. When electric power is applied to the winding 15, the core 17 and the plate 13 electromagnetically attract each other. The function of mutual limitation of motion is thus strengthened.

Referring again to FIGS. 1 through 3, the limit ring 21 is generally formed in a ring shape and is fixed with the boss portion 11 of the casing by means of press-fitting or the like. The limit ring 21 limits the retreat by abutting the plunger 19 retreating through the opening of the plate 13. The limit ring 21 may be formed of a non-magnetic material, such as any of austenitic stainless steels, in order to prevent leakage of the magnetic flux through the limit ring 21. The plate 13 may be pinched and thereby supported between the limit ring 21 and the core 17.

The limit ring 21 may be, in an area abutting on the plunger 19, provided with one or more slits 25 so as to suppress leakage of the magnetic flux through the abutting plunger 19. Each slit 25 may be, as shown in FIG. 2, formed in an arc-like shape elongated along the circumferential direction, and, in particular as shown in FIG. 1, they may be opened in an area corresponding to the outer ring of the plunger 19. Although the example drawn therein illustrate the slits 25 as through-holes, they may be instead bottomed holes. The inner ring of the non-magnetic material may abut on the limit ring 21 and nevertheless leakage of the magnetic flux would be rather small.

Alternatively, the plate may be integrally equipped with the limit ring. More specifically, in contrast to that shown in FIGS. 3 and 5, a plate 13A illustrated in FIGS. 6 and 7 includes a stopper 21A formed as a unitary body therewith and elongated radially inwardly from the opening defined by the inner periphery thereof. This example can omit a limit ring from the device 1 or may be further provided with any equivalent to the limit ring.

Figure 6:
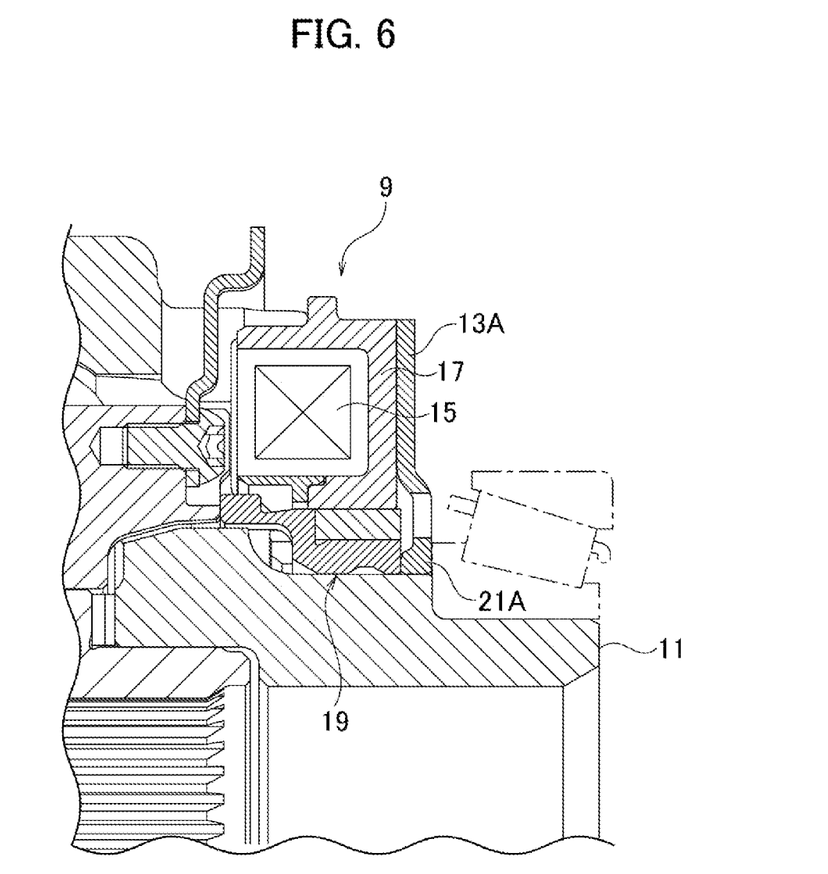
FIG. 6 is a partial sectional elevational view of a locking differential driven by a solenoid including a magnetic circuit element according to another implementation, which primarily shows the solenoid.
Figure 7:
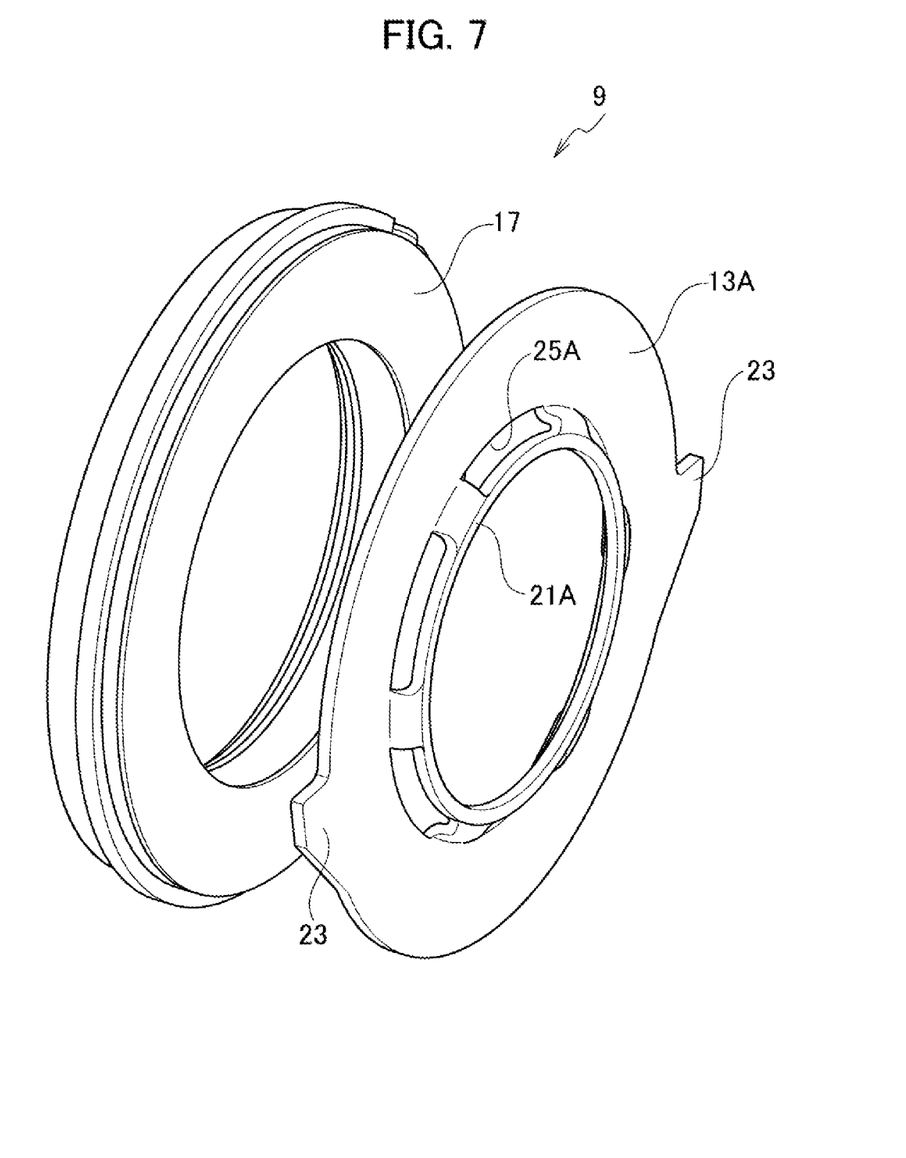
FIG. 7 is an exploded perspective view of the solenoid including the magnetic path corresponding to FIG. 6.

The stopper 21A is so dimensioned as to be, at its inner periphery, in contact with the boss portion 11 and butt against and stop the plunger 19. The stopper 21A may project axially from the opening. This is beneficial in widening the range of motion of the plunger 19. The structure of the stopper 21A can be readily constructed by cutting out portions of a single unitary flat plate and the axially projecting structure can be readily constructed by combining press-forming with the cutting process.

The stopper 21A may be, as with the aforementioned limit ring 21, provided with one or more slits 25A at an area abutting on the plunger 19, and each of them may be formed in an arc-like shape elongated circumferentially. Needless to say, the slits 25A may be either through-holes or bottomed holes.

In any of the embodiments shown in FIGS. 3, 4 and 6, the rear end of the receding plunger 19 abuts against the limit ring 21, the plate 13, or the stopper 21A. Nevertheless, constant contact is unnecessary and therefore any proper gap may exist there.

Referring again to FIGS. 5 and 7, the plate 13, 13A may be additionally provided with one or more tabs 23 that are unitary bodies with the plate and formed of the identical material. Each tab 23 may project out of the plate 13 and, in particular, project radially outward. In the axial direction, the tab 23 may be identical in thickness to the plate 13. Specifically, the plate 13 and the tab 23 may be produced unitarily by cutting a single flat plate.

Figure 8:
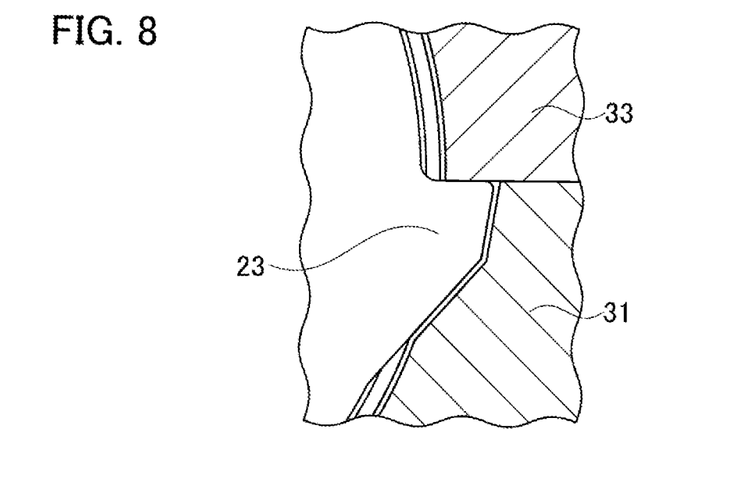
FIG. 8 is a partial sectional side view showing a relation between the magnetic circuit element and a carrier according to an example implementation.
Figure 9:
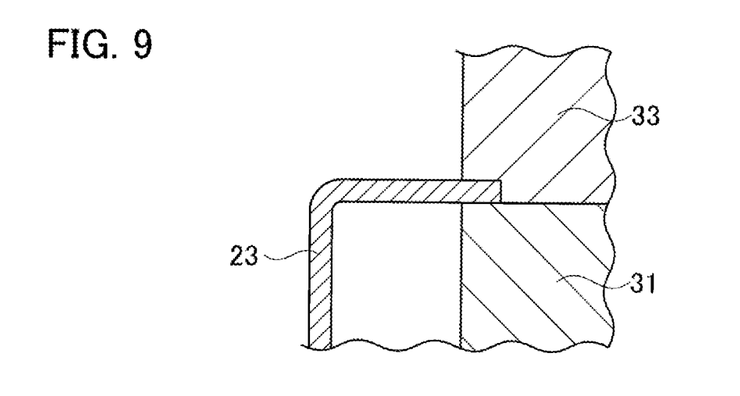
FIG. 9 is a partial sectional side view showing a relation between a magnetic circuit element and a carrier according to another example implementation.

The tabs 23 can be used to prevent rotation of the plate 13. As shown in FIG. 8 for example, grooves adapted for the tabs 23 may be formed in advance in a carrier 31 for supporting the differential device 1, and a cover 33 may be fixed thereon after the differential device 1 is installed in the carrier 31, thereby preventing rotation of the plate 13. The tabs 23 may be left flat but may be bent axially as shown in FIG. 9 so that these tip ends can be engaged with the carrier 31.

Figure 10:
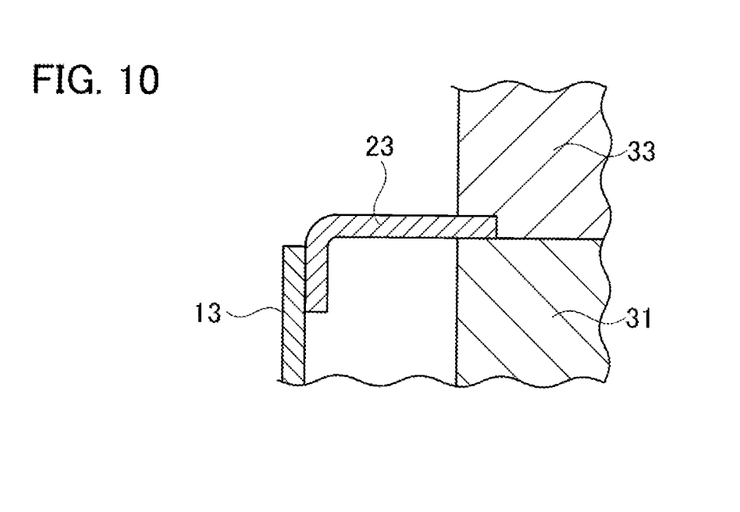
FIG. 10 is a partial sectional side view showing a relation between a magnetic circuit element and the carrier according to still another example implementation.

In conventional solenoid actuators, additional detent members are required to prevent rotation of cores and are fixed to the cores by means of welding or such. When welding is performed on a core having a large mass, the heating requires a non-negligible cost, the core is easily deformed by the influence of heat, or its magnetic properties are not a little deteriorated. In comparison, according to the above-described embodiment, no additional member or heating is required to prevent rotation, which is advantageous in terms of both manufacturing cost and magnetic properties Alternately, as shown in FIG. 10, any additional detent member may be fixed to the tabs 23 or the plate 13 by means of welding or such. The detent member may be made flat and bent in advance of fixation as shown therein. In these cases, the detent member may be formed of the identical material to the plate 13 but may be of any non-magnetic material. The latter is beneficial in reducing leakage of the magnetic flux.

Even if welding is used to fix the detent member, as the plate having a smaller mass than the core is subject to the welding, heat application would be less costly and as well heat affected deformation and deterioration in magnetic properties are necessarily suppressed. Further, as both these members are relatively thin flat plates, spot-welding or any such method can be used, which is further less costly and thermally less influential. Alternately, engagement, fitting, press-fitting, brazing, screw fastening or such is applicable in place of welding.

The plate 13, 13A is, as described already, formed of a soft magnetic material and, in particular, of that annealed for the purpose of improving its magnetic permeability. Further, in advance of, or after, machining or fixation of the detent member, any heat treatment can be carried out for the purpose of improving various properties such as wear resistance and anti-fatigue properties. Such heat treatments include a so-called gas soft nitriding treatment.

As will be readily understood from the above descriptions, any of these embodiments successfully omit one or more independent members such as the detent member and the limit ring, which are essential in the prior art, while maintaining these functions. Further, the design of the present disclosure can prevent deterioration of magnetic properties of the core by heat influence accompanied by welding. Consequently, the actuator can be reduced in size and accordingly the rotating machine in itself can be reduced in size.

Although certain exemplary embodiments are described above, modifications and variations of the implementations will occur to those skilled in the art, in light of the above teachings.

The invention claimed is:

1. A magnetic circuit element used in combination with an adjoining core of a solenoid that has an axis, the magnetic circuit element comprising:
   a plate including a soft magnetic material and having a face configured for contact with an axial end face of the core to form a magnetic path in combination with the core to conduct a magnetic flux,
   wherein the plate:
   forms a disk shape defining an opening around the axis, and
   is dimensioned as to extend the face from an inner periphery to an outer periphery of the axial end face of the core; and
   one or more tabs forming a unitary body with the plate and projecting at least radially outward.

2. The magnetic circuit element of claim 1, further comprising:
   a detent portion forming a unitary body with or joined with the plate or any of the tabs and projecting axially from the plate to prevent rotation.

3. The magnetic circuit element of claim 1, wherein the opening is dimensioned as to allow a plunger to pass axially through the opening, the plunger slidably fitting in an inner periphery of and being axially driven by the core.

4. The magnetic circuit element of claim 3, further comprising:
   a stopper forming a unitary body with or joined with the plate, the stopper extending radially inward from the opening and disposed to stop the plunger.

5. The magnetic circuit element of claim 3, wherein the stopper comprises one or more slits elongated circumferentially to limit contact with the plunger.

* * * * *